US008884147B1

(12) United States Patent
Stambaugh

(10) Patent No.: US 8,884,147 B1
(45) Date of Patent: Nov. 11, 2014

(54) METHOD OF CORRELATING MUSICAL SCALES AND MUSICAL CHORDS IN A COLOR CODE, A NUMBER CODE, OR BOTH, SIMULTANEOUSLY

(76) Inventor: Skysun Grady Stambaugh, Pinson, AL (US)

( * ) Notice: Subject to any disclaimer, the term of this patent is extended or adjusted under 35 U.S.C. 154(b) by 101 days.

(21) Appl. No.: 13/348,641

(22) Filed: Jan. 17, 2012

(51) Int. Cl.
*G10H 1/38* (2006.01)

(52) U.S. Cl.
USPC .................. 84/613; 84/609; 84/637; 84/649; 84/650; 84/669

(58) Field of Classification Search
None
See application file for complete search history.

(56) References Cited

U.S. PATENT DOCUMENTS

| 4,054,868 | A | 10/1977 | Rose |
| 5,320,020 | A | 6/1994 | Corley |
| 6,031,172 | A | 2/2000 | Papadopoulos |
| 6,515,210 | B2 | 2/2003 | Shibukawa |
| 6,791,568 | B2 | 9/2004 | Steinberg et al. |
| 6,831,219 | B1 * | 12/2004 | Bonham ...................... 84/483.2 |
| 6,881,883 | B2 * | 4/2005 | Harrison ........................ 84/317 |
| 7,893,337 | B2 * | 2/2011 | Lenz ............................ 84/477 R |
| 8,044,288 | B1 * | 10/2011 | Prieto .......................... 84/470 R |
| 8,304,641 | B1 * | 11/2012 | Stewart ........................ 84/483.2 |
| 2008/0141849 | A1 * | 6/2008 | Johnston ...................... 84/483.2 |
| 2008/0163742 | A1 | 7/2008 | Oliver |
| 2008/0314229 | A1 * | 12/2008 | Robledo ...................... 84/483.2 |
| 2009/0007760 | A1 * | 1/2009 | Herrick ........................... 84/478 |
| 2009/0025535 | A1 * | 1/2009 | Montgomery .............. 84/477 R |
| 2009/0114079 | A1 * | 5/2009 | Egan ........................... 84/477 R |
| 2010/0263517 | A1 * | 10/2010 | Robledo ...................... 84/483.2 |
| 2011/0259178 | A1 * | 10/2011 | Hiner et al. ................. 84/477 R |
| 2012/0304847 | A1 * | 12/2012 | Hacker ....................... 84/470 R |

FOREIGN PATENT DOCUMENTS

CA      1471484 A2    10/2004
EP      2304713 A2    6/2011

* cited by examiner

*Primary Examiner* — Marlon Fletcher

(57) ABSTRACT

A method of correlating scales or chords that is represented as color codes, number codes, or both. The method involves correlating at least one chord with another. The method also involves correlating scales with one another. Furthermore, the method involves correlating chords with scales as well. Notes of scales or chords are assigned colors. Notes of one scale or chord are assigned one color. Notes of another scale or chord are assigned another color. Then at least one distinguishing color is assigned to notes that occur in more than one scale or chord in the correlation. Also, when chords are correlated with scales, distinguishing colors are assigned to notes that occur in more than one musical concept. When more than two chords or scales are correlated by the method, different distinguishing colors are assigned to notes that occur in three or more scales or chords.

20 Claims, 13 Drawing Sheets

1201-LIGHT BULB

Figure 1:
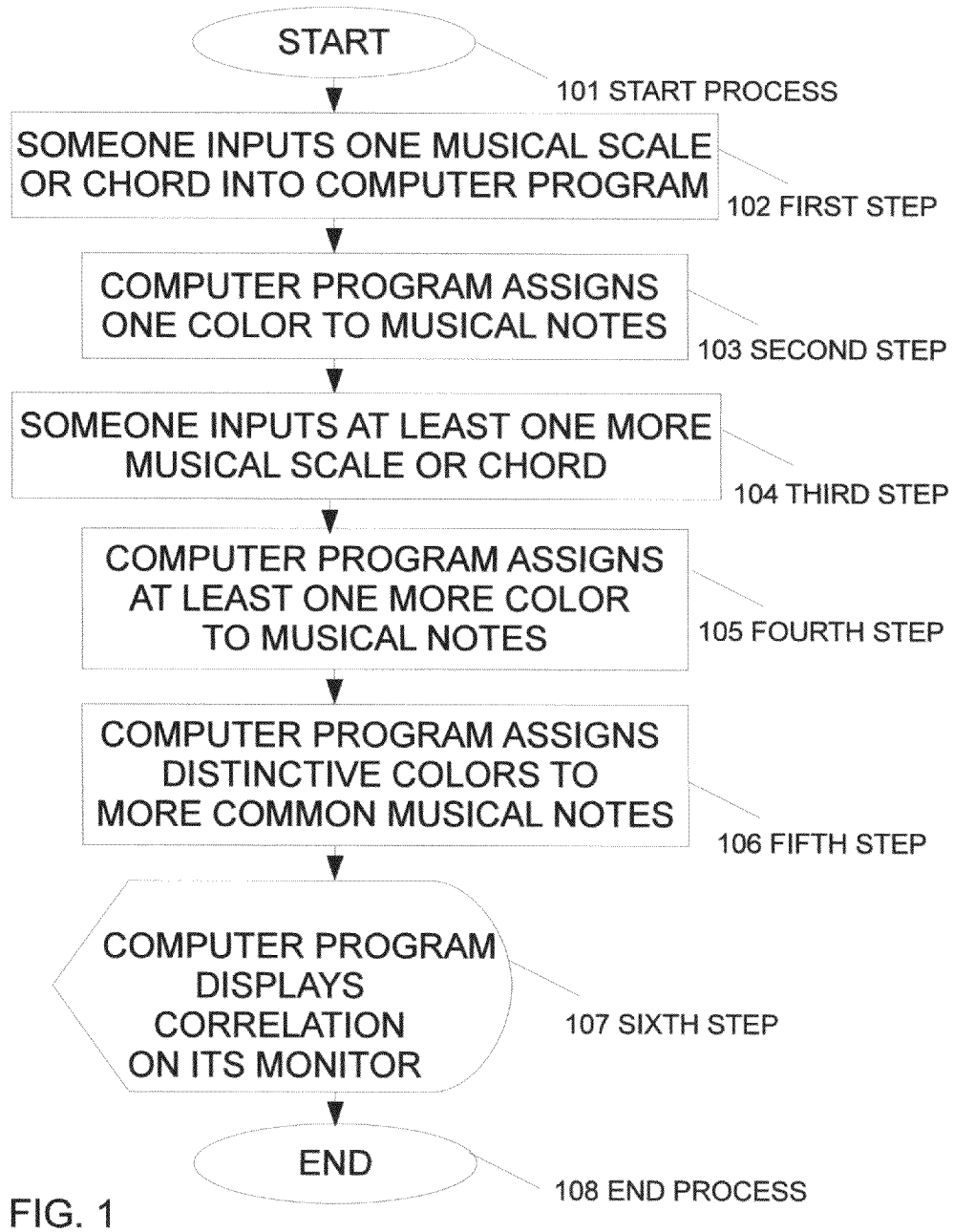

METHOD OF CORRELATING MUSICAL SCALES AND MUSICAL CHORDS IN A COLOR CODE, A NUMBER CODE, OR BOTH, SIMULTANEOUSLY

CROSS-REFERENCE TO RELATED APPLICATION

Nonapplicable

BACKGROUND

This application relates to correlating scales and chords in color codes or number codes and enabling devices such as musical instruments and computer programs to convey at least one correlation so that teachers can teach musical concepts to students.

BACKGROUND

Prior Art

The following is a tabulation of some prior art that presently appears relevant:

U.S. Patents

| Pat. No. | Kind Code | Publication Date | Patentee |
|---|---|---|---|
| 6,031,172 | | Feb. 29, 2000 | Marios Papadopoulos |
| 6,831,219 | B1 | Jul. 10, 2008 | David C. Bonham |
| 0,163,742 | A1 | Jul. 10, 2008 | Janet L. Oliver |
| 5,320,020 | | Jun. 15, 1994 | Steven T. Corley |
| 4,054,868 | | Oct. 18, 1977 | William J. Rose |
| 6,155,210 | B2 | Feb. 4, 2003 | Takeo Shibukawa |

For many years colors have been associated to musical notes for a myriad of different reasons. Several methods have been patented for many different aspects of music. Most of the methods have been created to make learning music theory easier for students of music.

In the prior art for example, Marios Papadopoulos was issued a patent (U.S. Pat. No. 6,031,172) of a teaching aid that was published on Feb. 29, 2000. Distinguishing colors were assigned to all of the different notes of a comprehensive chromatic scale. Therefore, each note was made distinguishable from any other note with colors. Colors were assigned to notes, as opposed to letters, which made learning music theory just as complicated as before. David C. Bonham was issued a different patent (U.S. Pat. No. 6,831,219) that involved assigning colors to musical notes on Jul. 10, 2008. According to harmonic structure, colors were assigned to each note of a major scale. The method was patented for the purpose of providing an alternate way of reading and writing music notation so that the harmonic structure of musical pieces could easily be ascertained and recognized. Jane L. Oliver was issued a different patent (US 20080163742), on Jul. 10, 2008, where labels were affixed to fretted instruments. The method was patented so that students of music could play chords with correct fingerings. Also, Steven T. Corley was issued a different patent (U.S. Pat. No. 5,320,020), on Jun. 15, 1994, where flash cards of chords were printed for the purpose of learning and recognizing chords. Also, William J. Rose was issued a different patent (U.S. Pat. No. 4,054,868), on Oct. 18, 1977, where a correlation of scales or chords was displayed on a device. I have found that this would be complicated for a beginner. Correlations were displayed on the device for the purpose of choosing chords that would coincide with scales during musical pieces. Lastly, Takeo Shibukawa was issued yet another patent (U.S. Pat. No. 6,515,210), on Feb. 4, 2003, for enabling a keyboard and its keys to convey musical notation. Once more, different notes were assigned distinguishing colors.

Many of the patents in the prior art involve assigning different colors to different notes of scales or chords for different reasons. Other patent involve learning scales, chords, and relationships between them.

SUMMARY

In the application, a method of correlating scales and chords is described. The purpose of the method is described so that musicians will be able to distinguish more common notes from less common notes of correlations of scales and chords. Many possible correlations of scales and chords are included in the application. By the method, color codes and number codes of correlations of scales and chords are included. Color codes are described and then number codes are described later in the application.

By the method, one color is assigned to notes of one scale or chord. Then another color is assigned to notes of a different scale or chord. In correlations of two or more scales or chords, notes that are more common than other notes are then assigned a distinguishing color. When three or more scales or chords are correlated, sometimes many colors are assigned to notes to make more common notes distinguishable from other notes. Numbers are assigned to notes in a similar manner by the method of correlating scales and chords.

While examples of correlations are included in the application, any colors or numbers could be assigned to notes of scales or chords. When colors are used, generally five bits of information, or less, are involved in color codes or number codes. Furthermore, by the method, any distinguishing features like colors, numbers, shapes, or even braille could be assigned to notes. Devices such as computer programs and musical instruments could be manufactured, or labeled, accordingly to convey one or more correlations of the method. The devices could then be used as teaching aids.

In one embodiment of the method, color codes and number codes are conveyed by the computer program simultaneously because there is a difference between the two. The method could be taught by teachers, in color codes, number codes, or both, so that color codes and number codes of the method could be compared and contrasted. When color codes and number codes of the method are conveyed by the computer program, musical pieces could be written according to color codes, number codes, or both.

Educational Value

With teaching aids, teachers could teach this method to their students for many different reasons. With teaching aids of the method, students could learn relationships between chords in color codes. Students could also learn relationships between scales in color codes. Students could learn relationships between scales and chords with teaching aids. Furthermore, students could learn the difference between color codes and number codes of the method with teaching aids. Teachers could affix labels to instruments in color codes, number codes, or both. Teachers could then use instruments as teaching aids to teach musical relationships to their students. Teachers could teach musical pieces with many different correlations. Teachers could teach a verse with one correlation and a chorus with another. Finally, teachers could also teach students why certain notes, chords, and scales are played in musical pieces.

Creative Value

While teachers could teach the method to students, it could benefit musicians as well. A group of musicians such as a band could use the method for writing songs. Musicians could write melodies, chords progressions, and bass lines with correlations of scales, chords, or both. A songwriter could use one correlation of scales or chords for his or her particular style. Songwriters could write musical pieces with any correlation, or any number of correlations, they choose. Musicians could affix labels of the method to their instrument of choice for the purpose of teaching, writing, or improvising musical pieces. The method could also enable musicians in bands to understand relationships between scales or chords. Musicians in bands could master improvisation of solos with the method. Musicians in orchestras could also affix labels to instruments for teaching and learning musical concepts. Musicians could then simply remove labels from instruments before performances. The method could also help musicians to better understand musical pieces that have already been written. So whether used for teaching or writing musical pieces, the method could help musicians understand how scales or chords are related to one another in music.

Advantages

These advantages are for one or more aspects of one or more embodiments. The first advantage of one or more aspects of one or more embodiments is that, in correlations, more common notes can be distinguished from less common notes. Another advantage of one more aspects is that at least three scales, or chords, can be correlated with one another in color codes. Another advantage of one more aspects is that chords and scales can be correlated with one another in color codes. Another advantage of one more aspects is that any amount of scales and chords can be correlated with other scales and chords in number codes. Another advantage of one or more aspects is that numbers can be assigned to notes, instead of colors, so that those who suffer from color blindness could benefit from the method as well. Another advantage of one more aspects is that any instrument can be labeled for teaching purposes. Another advantage of more aspects is that color codes and number codes of the method can be compared and contrasted. Another advantage of one or more aspects is that teaching aids of the method can be printed in color codes, number codes, or both, for the purpose of learning, comparing and contrasting, musical concepts. Another advantage of one more aspects of one or more embodiments is that all of the embodiments in the application can be used as teaching aids. Finally, another advantage of color codes, and number codes, is that beginners can recognize, and recall, five, seven, and nine bits of information well.

These and other advantages of one or more aspects will become apparent from a consideration of the ensuing description and accompanying drawings.

DRAWINGS

Figures

Figure 2:
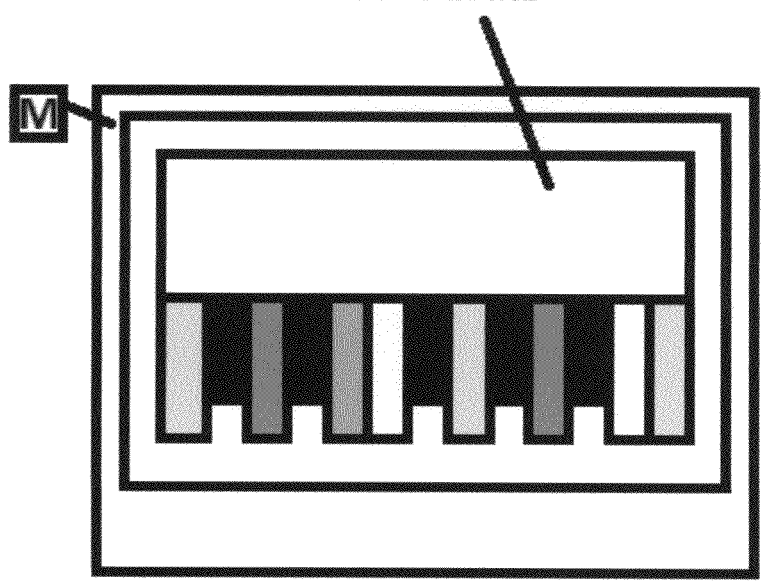
Figure 3:
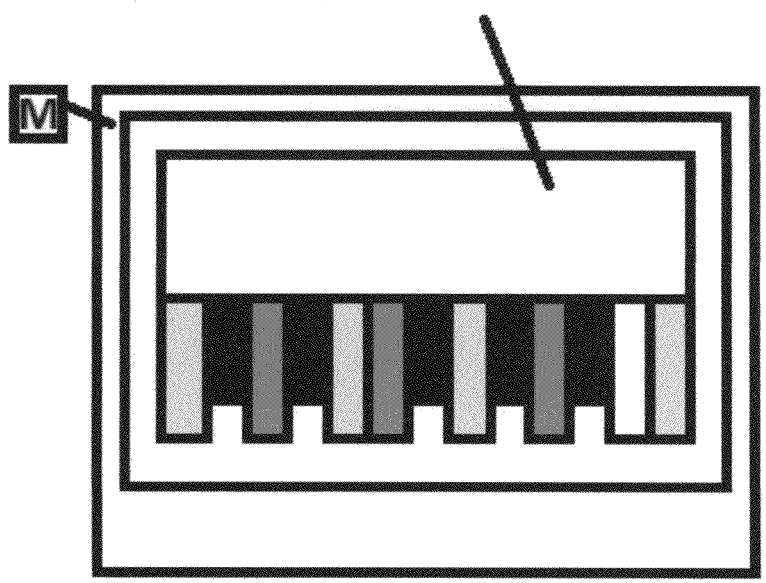
Figure 4:
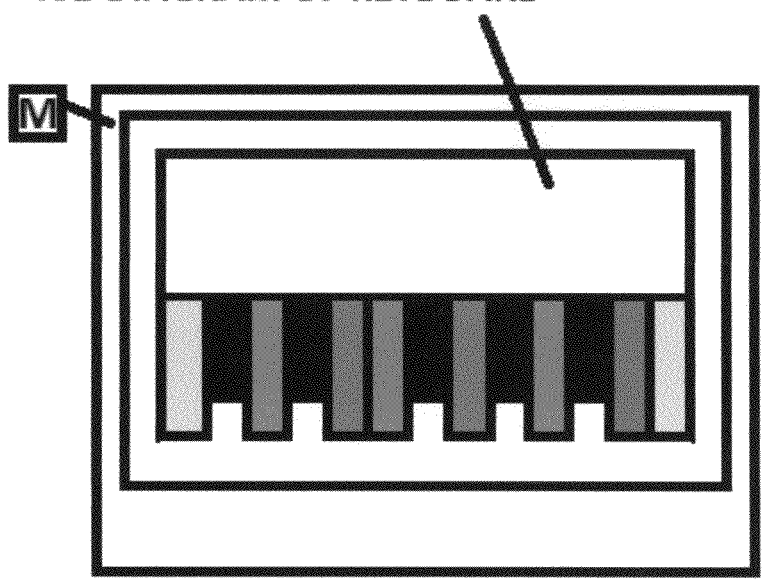
Figure 5:
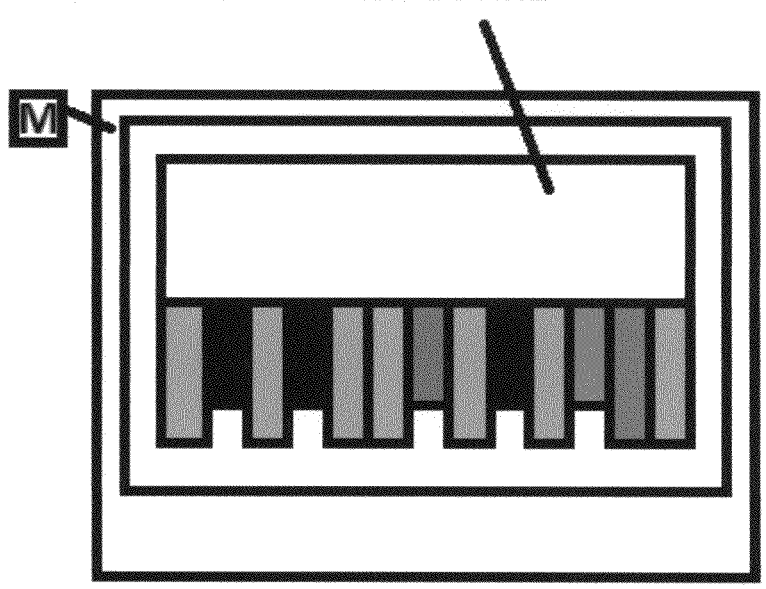
Figure 6:
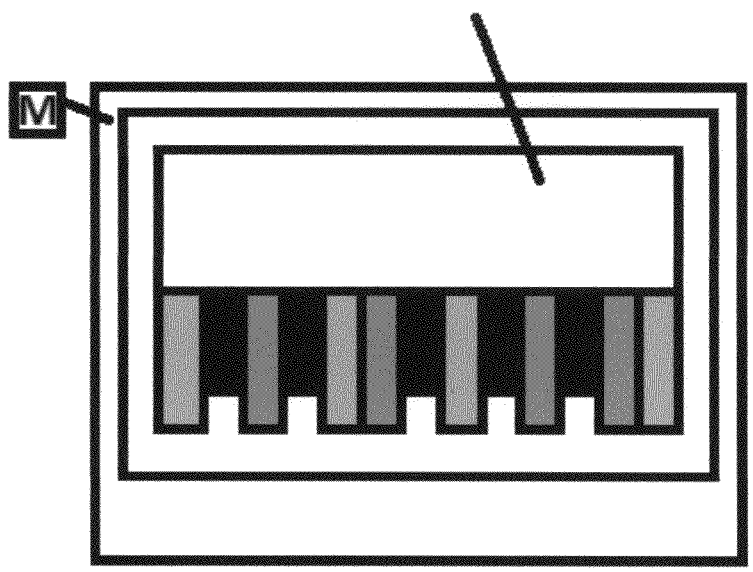
Figure 7:
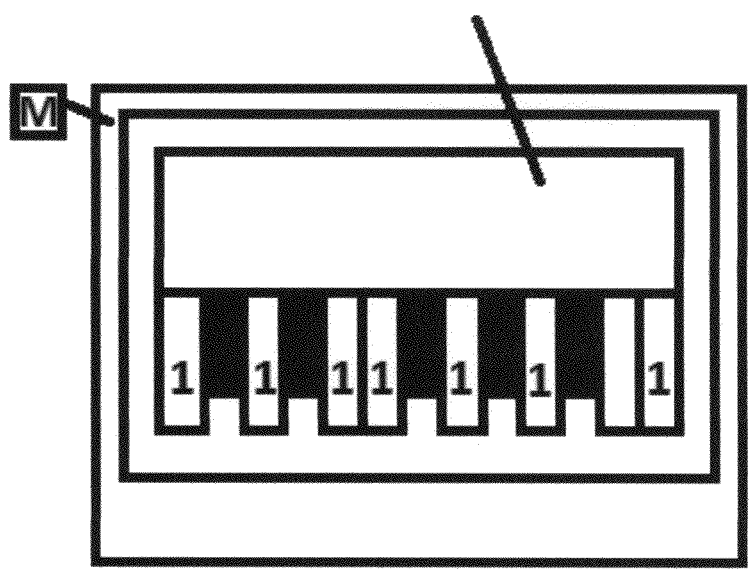
Figure 8:
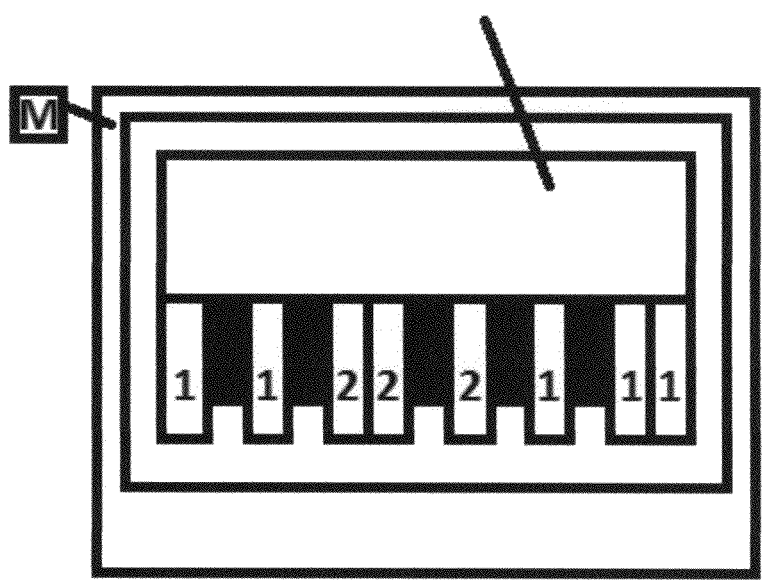
Figure 9:
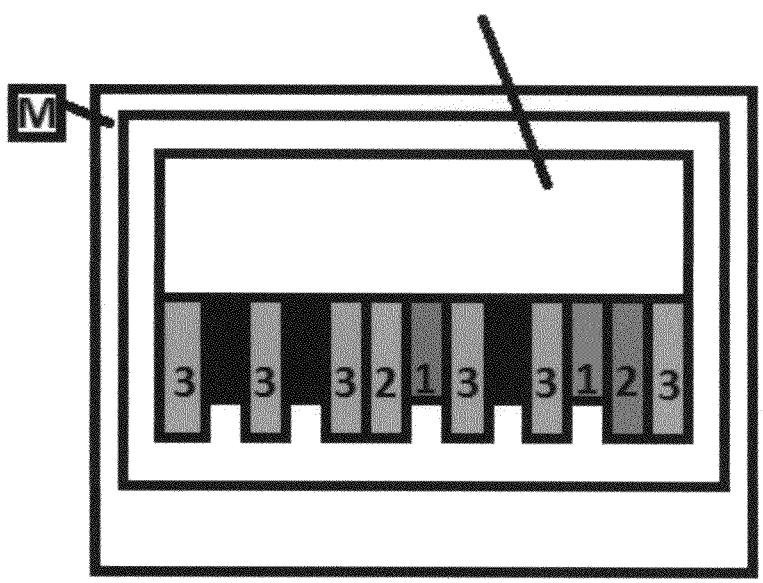
Figure 10:
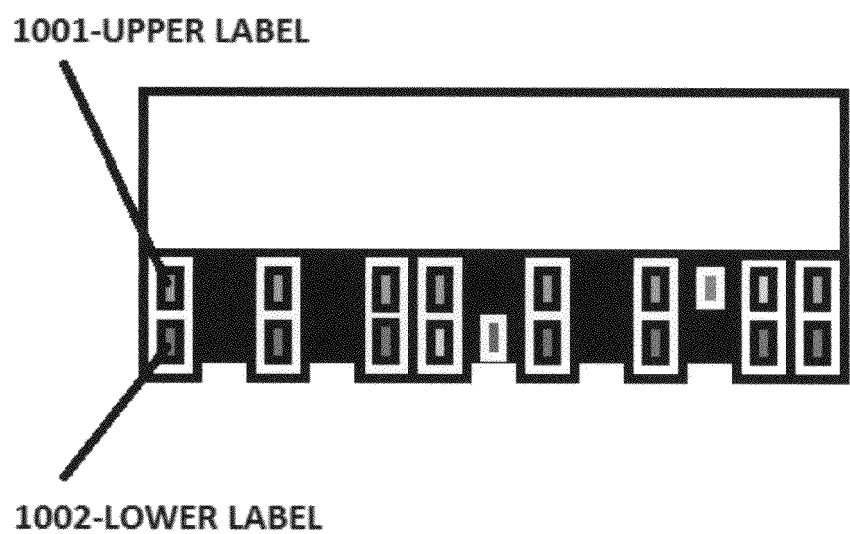
Figure 11:
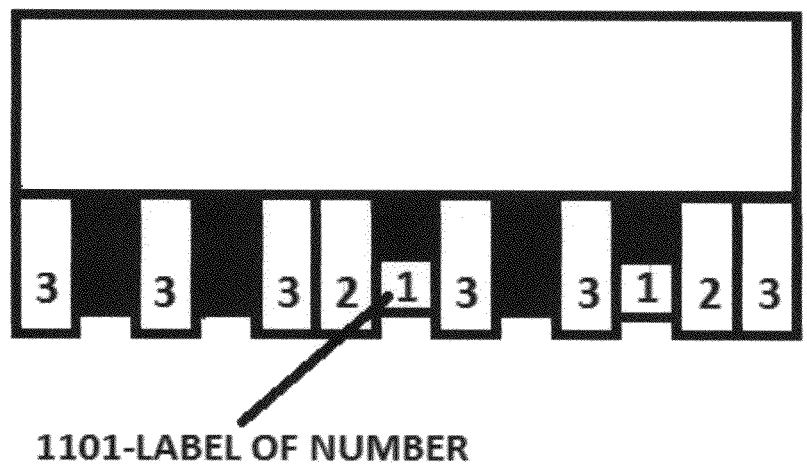
Figure 12:
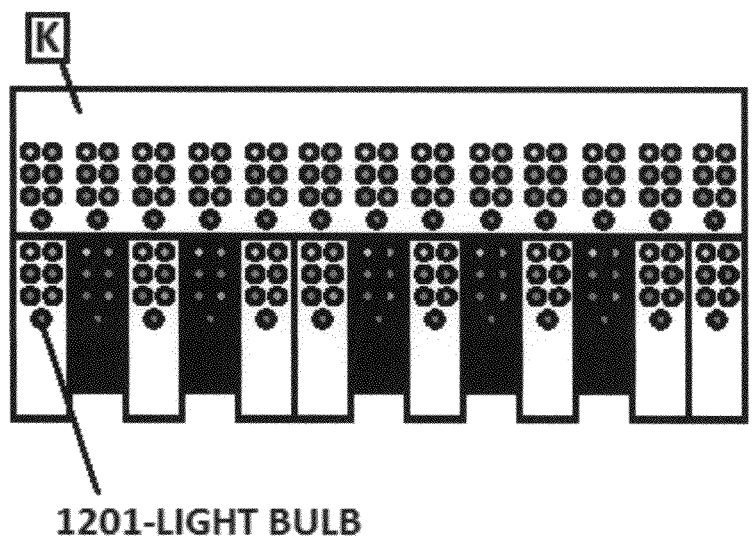
Figure 13:
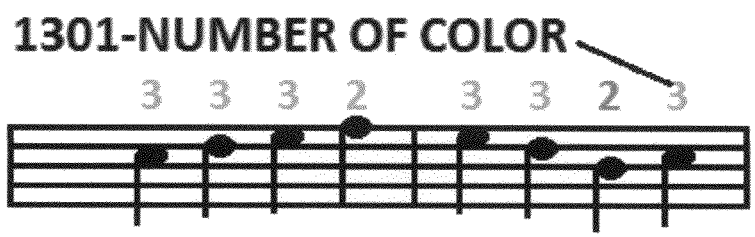

FIG. 1 Flowchart of computer program.
FIG. 2 Computer program conveying a correlation of a C major chord and a D suspended second chord.
FIG. 3 Computer program conveying a correlation of the C major chord and a D minor chord.
FIG. 4 Computer program conveying a correlation of the C major chord, the D minor chord, and an E minor chord.
FIG. 5 Computer program conveying a correlation of the C major scale, an F major scale, and a G major scale.
FIG. 6 Computer program conveying a correlation of the C major chord and the C major scale.
FIG. 7 Computer program conveying the correlation of the C major chord and the D minor chord in the number code.
FIG. 8 Computer program conveying, in the number code, the correlation of the C major chord, the D minor chord, the E minor chord, and an F major chord.
FIG. 9 Computer program conveying, in the color code and the number code, the correlation of the C major scale, the F major scale, and the G major scale.
FIG. 10 Keyboard with labels affixed to certain keys that conveys the method in at least two different correlations simultaneously.
FIG. 11 Keyboard with labels affixed to certain keys that conveys the method in at least one number code.
FIG. 12 Keyboard wired with light bulbs of different colors that conveys the method in at least one correlation of scales or chords.
FIG. 13 Method applied to musical notation in color code and number code.

DRAWINGS

Reference Numerals

101 Start of process.
102 First step.
103 Second step.
104 Third step.
105 Fourth Step.
106 Fifth Step.
107 Sixth step.
108 End process.
201 Diagram of keyboard of the correlation of the C major chord and the D suspended second chord.
301 Diagram of keyboard of the correlation of the C major chord and the D minor chord.
401 Diagram of keyboard of the correlation of the C major chord, the D minor chord, and the E minor chord.
501 Diagram of keyboard of the correlation of the C major scale and the F major scale.
601 Diagram of keyboard of the correlation of the C major scale, the F major scale, and the G major scale.
701 Diagram of keyboard of the correlation of the C major chord and the C major scale.
801 Diagram of keyboard of the correlation of the C major chord and the D minor chord in the number code.
901 Diagram of keyboard of the correlation of the C major scale, the F major scale, and the G major scale in the color code and the number code.
1001 Upper label that is a secondary color orange.
1002 Lower label that is a secondary color green.
1101 Label with number.
1201 Light bulb of many light bulbs that is for conveying the method in at least one color code.
1301 Number of color applied to musical notation.

BASIC DESCRIPTION

The application includes many different embodiments. Some embodiments involve correlations of scales in color codes. Some embodiments involve correlations of chords in color codes. Furthermore, some of them involve correlations of scales and chords in color codes. Finally, some embodiments involve correlations of the method in number codes.

Embodiments involve numbers codes, instead of, or in addition to, color codes, for certain reasons. Embodiments involve number codes because, when numbers are used, an infinite amount of scales and chords can be correlated. Embodiments also involve number codes so that those who suffer from color blindness can use the method as well. All of the embodiments involve correlating pluralities of notes such as scales and chords.

By the method, colors are assigned to notes in scales and chords. In any possible correlation, when two scales or chords are correlated, one distinguishing color is then assigned to notes that occur in more than one of the scales or chords. When three or more scales or chords are correlated, distinguishing colors are also assigned to notes that occur in three or more scales or chords. And so on. Thus, in correlations, distinguishing colors are assigned to more common notes. By the method, numbers are also assigned to notes in a similar manner. Several examples of a multitude of possible correlations are included in the drawings.

While every possible correlation is not included, I believe that anybody with experience in music could fully understand the method and its potential by reading the application.

DETAILED DESCRIPTION

Description

First Embodiment

In FIG. 1, I have included a flowchart of the method. I have included the flowchart to show how the computer program would process the method.

In FIG. 1, two or more scales or chords could be inputted into the computer program. The computer program could then correlate and convey at least one correlation of scales or chords. Teachers could then use computer programs as teaching aids. With the computer program, teachers could teach relationships between notes of correlations that occur in scales, chords, or both. Monitors could display correlations of the method to entire classrooms of students.

Teachers or students could input at least two scales or chords into the computer program. Then the computer program could convey an almost instantaneous correlation of musical concepts as at least one color code or at least one number code. Somewhat like a mathematical calculator, the computer program could correlate and convey musical concepts more quickly than a human.

Flowchart

As for FIG. 1, the computer program processes the method accordingly. The process starts (101). The computer program follows the method in steps. Someone inputs one scale or chord into the computer program. This is the first step (102). Then the computer program assigns one color to notes of the scale or chord. This is the second step (103). Someone then inputs at least one more scale or chord into the computer program. This is the third step (104). The computer program then assigns at least one more color to notes of at least one more scale or chord. This is the fourth step (105). The computer program then assigns distinguishing colors to notes of correlations that are more common than other notes. The computer program assigns distinguishing colors to notes according to how often the notes occur in the chords, or scales, of the correlation. Thus, the computer program makes certain notes distinguishable from other notes in the correlation. This is the fifth step (106). Finally, the computer program conveys at least one correlation on its monitor ("M within square). The monitor displays at least one possible correlation. This is the sixth step (107). Then the process ends (108).

Main Purposes of Method and all Embodiments

People could could use the method and any possible embodiments for at least the purposes that follow. People could associate colors to notes for the purpose of understanding, and recognizing, more common notes, less common notes, and notes that do not occur, in correlations of scales or chords. In any possible correlation of scales or chords, people could distinguish more common notes from less common notes. In any possible correlation of scales and chords, people could also distinguish more common notes from less common notes. With colors or numbers, people could use the method to write musical pieces more effectively. Composers could use correlations to write musical pieces more efficiently as well. With teaching aids of the method, teachers could also use the method to teach musical concepts to their students. Teachers could also use the method to teach students relationships between musical concepts of musical pieces that have already been written. Therefore, people could use any possible embodiment of the method for teaching, learning, or writing musical pieces more efficiently and more effectively.

Ramifications

I have included many different ramifications of the method in the application. I have included one small section of ramifications for each embodiment so that many possible ramifications of different embodiments are, hopefully, easier to understand.

By the method, chords could be correlated with one another and correlations could be conveyed by any instrument. By the method, scales could be correlated with one another and correlations could be conveyed by any instrument as well. Furthermore, by the method, scales could also be correlated with chords and correlations could be conveyed by any instrument.

Any instrument could be manufactured according to any possible correlation of the method. For example, a harmonica could be manufactured to play only certain notes that occur in any particular correlation. Less common notes, or notes that do not occur in the correlation of scales or chords could simply be omitted from the instrument. Thus, the harmonica or any other instrument could be manufactured to play notes that occur in one correlation, or any number of possible correlations, of scales and chords.

By the method, any possible scales and chords could be correlated with any other scales or chords. By the method, any plurality of notes could be correlated with any other plurality of notes.

By the method, the computer program could print teaching aids of correlations, in any size, to paper, or posters, for enabling teachers, students, and musicians, to learn, use, and teach the method to others.

OPERATION

First Embodiment

As for FIG. 1, the computer program processes the method accordingly. The process starts (101). The computer program follows the method in steps. Someone inputs one scale or chord into the computer program. This is the first step (102). Then the computer program assigns one color to notes of the scale or chord. This is the second step (103). Someone then inputs at least one more scale or chord into the computer program. This is the third step (104). The computer program then assigns at least one more color to notes of at least one more scale or chord. This is the fourth step (105). The computer program then assigns distinguishing colors to notes that are more common than other notes of the scales or chords of the correlation. This is the fifth step (106). Finally, the computer program conveys at least one correlation on its monitor ("M" within square). This is the sixth step (107). Then the process ends (108).

DESCRIPTION

Additional Embodiment

As for FIG. 2, the computer program could perform the method and convey any correlation of scales or chords on its monitor. A video game of the method could convey any correlation as well. Even though the embodiment of the computer program is included, a smaller calculator could perform and convey the same tasks as well.

In FIG. 2, the computer program conveys one of a multitude of possible correlations of chords. The computer program conveys the correlation of the C major chord and the D suspended second chord on its monitor ("M" within square).

By the method, the computer program shades keys of the keyboard different colors according to how many times corresponding notes occur in the chords of the correlation. The computer program assigns notes of the C major chord a primary color yellow. The computer program assigns notes of the D suspended second chord a primary color red. By the method, the computer program assigns an E note a secondary color orange because the E note occurs two times in the correlation of two chords.

While the correlation of the method involves the C major chord and the D suspended second chord, the computer program could convey any possible correlation of chords.

In other correlations, the computer program would assign distinguishing colors to any notes, or keys, that would occur more often than other notes, or keys, in correlations.

Color Code

In FIG. 2, the correlation of chords in diagram of keyboard (201) shows that there is one note that occurs more often than other notes of the correlation.

In the correlation, the computer program shades keys different colors according to the method. The E note occurs in the C major chord and the D suspended second chord. The E note also occurs more often than other notes in the correlation of chords. The computer program shades an E key the color orange. The E key represents the E note.

The computer program shades keys primary colors as well. The computer program shades keys the color yellow because there are note of the C major chord that do not occur in the D suspended second chord. The computer program shades keys that represent a C note the color yellow. The computer program also shades the key that represents a G note the color yellow. The computer program shades keys the color red because there are notes of the D suspended second chord that do not occur in the C major chord. The computer program shades the key that represents a D note the color red. The computer program also shades the key that represents an A note the color red.

Overview of Method

In any possible correlation of chords, the computer program assigns distinguishing colors to notes according to how often corresponding notes occur in the correlation. The computer program then shades corresponding keys accordingly for at least one possible correlation. The computer program then conveys at least one correlation on its monitor ("M" within square).

Chunks of Information

In 1956, a paper, by George A. Miller, became famous not long after it was published. *The Magical Number Seven, Plus or minus Two: Some Limits on our capacity for Processing* was the title of the paper.

The paper, and study, proved that information can be stored in the brain in many ways. The study showed that letters can be stored individually, or grouped into words. The study also found that no matter how information is stored in the brain, the brain can only process five to nine chunks of information with accuracy. The study also found that when people have to remember less chunks of information, they are generally more accurate when it comes to recalling the information.

People process information according to how many chunks have to be recognized and recalled. People process less chunks of information with more accuracy. People process more chunks of information with less accuracy.

In some embodiments, including diagram of keyboard (201), three colors, or chunks, of information occur in the color code. This simplifies the process of learning, and recognizing, relationships between notes, scales, and chords. Traditional names of notes (C, C#, Db, D, D#, Eb, E, F, F#, Gb, G, G#, Ab, A, A#, Bb, and B) make the process of learning, and recognizing, relationships between musical concepts more complicated than necessary for any beginner. In FIG. 2, three different colors result, giving traditional names of notes a psychological disadvantage. Elementary school students learn primary, secondary, and even tertiary colors, at a young age. Students do not learn flat signs, or sharp signs, unless they specifically take a music class in school. Therefore, students generally recognize, and recall, common colors with no problem because there are less chunks of information to remember. Often, people learn, and recognize, primary colors, secondary colors, and tertiary colors before they even learn to read.

Without flat and sharp signs, without letters, and with less chunks of information to remember, I believe that teaching students of music with teaching aids of correlations, in color codes, number codes, or both, could enable students to comprehend music theory more quickly and more effectively.

Purposes of Embodiment

In FIG. 2, the correlation of chords in diagram of keyboard (201) shows that the E note is more common than other notes of the correlation. In FIG. 2, diagram of keyboard also shows that some notes, the C note, the D note, the G note and the A note, are less common than the E note in the correlation of chords.

Ramifications

By the method, any scales or chords could be correlated with other scales or chords in any color code. Numbers could also be assigned to notes of chords or scales. Numbers could be assigned to notes because there are only three different primary colors. Numbers could also be assigned to notes because those who are color blind would not be able to use color codes of the method. From songwriters to orchestras, the method could be taught with color codes, number codes, or both.

OPERATION

Additional Embodiment

Someone inputs one chord into the computer program. The computer program assigns one color to notes of the chord.

Someone inputs at least one more chord into the computer program. The computer program then assigns at least one more color to notes of at least one more chord. The computer program then correlates the chords. Finally, the computer program assigns distinguishing colors to notes that are more common than other notes of the chords of the correlation. The computer program assigns different colors to notes according to how often the notes occur in the correlation of chords. Thus, the computer program makes certain notes distinguishable from other notes in the correlation. The computer program then conveys the resulting color code on its monitor ("M" within square). In FIG. 2, diagram of keyboard (201) shows the correlation.

DESCRIPTION

Additional Embodiment

In FIG. 3, the computer program correlates one chord with a different chord. The computer program conveys the correlation on its monitor ("M" within square). The computer program conveys the correlation of the C major chord and the D minor chord.

The computer program assigns colors to notes of the C major chord and the D minor chord. The computer program assigns the primary color yellow to notes that occur in the C major chord. The computer program assigns the primary color red to notes that occur in the D minor chord.

Color Code

In the correlation, the computer program shades keys primary colors. The computer program shades keys the color yellow because there are notes of the C major chord that do not occur in the D minor chord. The computer program shades keys that represent the C note, the E note, and the G note the color yellow. The computer program shades keys the color red because there are notes of the D minor chord that do not occur in the C major chord. The computer program shades the keys that represent the D note, an F note, and the A note the color red. Thus, diagram of keyboard (301) shows that there are no notes that are more common than other notes in the correlation of chords.

Purpose of Embodiment

In FIG. 3, the correlation of chords in diagram of keyboard (301) shows that there are no notes that occur more often than other notes of the correlation.

OPERATION

Additional Embodiment

Someone inputs one chord into the computer program. The computer program assigns one color to notes of the chord. Someone inputs at least one more chord into the computer program. The computer program then assigns at least one more color to notes of at least one more chord. The computer program then correlates the chords. Finally, the computer program assigns distinguishing colors to notes that are more common than other notes in the chords of the correlation. The computer program assigns different colors to notes according to how often the notes occur in the chords of the correlation. Thus, the computer program makes certain notes distinguishable from other notes in the correlation. The computer program then conveys the resulting color code on its monitor ("M" within square). In FIG. 3, diagram of keyboard (301) shows the correlation.

DESCRIPTION

Additional Embodiment

In FIG. 4, the computer program correlates three chords with each other. The computer program conveys the correlation on its monitor ("M" within square). The computer program conveys the correlation of the C major chord, the D minor chord, and the E minor chord in.

The computer program assigns three different colors to notes of three different chords in FIG. 4. The computer program assigns the primary color yellow to notes that occur in the C major chord. The computer program assigns the primary color red to notes that occur in the D minor chord. The computer program assigns a primary color blue to notes that occur in the E minor chord.

Color Code

In the correlation, the computer program shades keys different colors according to the method. The E note and the G note occur in the C major chord and the E minor chord. In the correlation of chords, the E note and the G note also occur more often than other notes of the correlation. The computer program shades the E key the color green because the E note occurs in both the C major chord and the E minor chord. The computer program also shades a G key the color green because the G note occurs in the C major chord and the E minor chord.

The computer program shades keys primary colors as well. The computer program shades keys the color yellow because one note occurs in the C major chord that does not occur in the D minor chord or the E minor chord. The computer program shades keys that represent the note, the C note, the color yellow. The computer program shades keys the color red because notes occur in the D minor chord that do not occur in the C major chord or the E minor chord. The computer program shades keys that represent the D note, the F note, and the A note the color red because no notes of the D minor chord occur in one of the other chords of the correlation. The computer program shades one key the color blue because one note occurs in the E minor chord that does not occur in the C major chord or the D minor chord. The computer program shades a B key the color blue because a B note occurs in the E minor chord, but does not occur in the other chords of the correlation.

Purposes of Embodiment

In FIG. 4, the correlation of chords in diagram of keyboard (401) shows that there are notes that occur more often than other notes of the correlation. In FIG. 4, diagram of keyboard (401) also shows that the E note and the G note are more common than other notes that occur in the correlation of chords.

OPERATION

Additional Embodiment

Someone inputs one chord into the computer program. The computer program assigns one color to notes of the chord. Someone inputs at least one more chord into the computer program. The computer program then assigns at least one more color to notes of at least one more chord. The computer program assigns colors to notes of as many chords as someone chooses to input into the computer program. The computer program then correlates the chords. Finally, the computer program assigns distinguishing colors to notes that are more common than other notes of the chords of the correlation. The computer program assigns different colors to notes according to how often the notes occur in the chords of the correlation. Thus, the computer program makes certain notes distinguishable from other notes in the correlation. The computer program then conveys the resulting color code on its monitor ("M" within square). In FIG. 4, diagram of keyboard (401) shows the correlation.

DESCRIPTION

Additional Embodiment

In FIG. 5, the computer program correlates three scales with each other. The computer program conveys the correlation on its monitor ("M" within square). The computer program conveys the correlation of the C major scale, the F major scale, and the G major scale.

The computer program assigns colors to notes of three scales in the embodiment. The computer program assigns the primary color yellow to notes that occur in the C major scale. The computer program assigns the primary color red to notes that occur in the F major scale. Finally, the computer program assigns the color blue to notes that occur in the G major scale.
Color Code In the correlation, the computer program shades keys different colors according to the method. The computer program shades some keys a tertiary color brown in the embodiment. The computer program shades keys that represent the C note, the D note, the E note, the G note, and the A note the color brown. The computer program shades these keys the color brown because the notes that the keys represent occur in all three chords of the correlation. The computer program also shades keys secondary colors in the embodiment. The computer program shades one key the secondary color orange. An F note occurs in the C major scale and the F major scale, but does not occur in the G major scale. Therefore, the computer program shades an F key the color orange because the F note occurs in the C major scale and the F major scale, but not in the G major scale. The computer program shades one key the secondary color green. The computer program shades a B key the color green because the B note occurs in the G major scale, but does not occur in the C major scale or the F major scale.

In the correlation, the computer program also shades keys that represent notes that occur in one scale, but not more than one scale, corresponding primary colors. The computer program shades an F sharp key (or a G flat key) the color blue because an F sharp note (or a G flat note) occurs in the G major scale, but does not occur in the C major scale or the F major scale. The computer program also shades an A sharp key (or a B flat key) the color red because an A sharp note (or a B flat note) occurs in the F major scale, but does not occur in the C major scale or the G major scale.
Multiple Correlations In music theory, there is one natural minor scale for every major scale. For example, the C major scale is essentially the same scale as an A minor scale in that the very same notes occur in both of the scales. Therefore, one correlation of two scales is essentially four different correlations in one. Furthermore, the correlation of three scales in FIG. 5 is essentially eight correlations in one. These correlations are: the A minor scale, a D minor scale, and an E minor scale; the A minor scale, the D minor scale, and the G major scale; the A minor scale, the E minor scale, and the F major scale; the A minor scale, the F major scale, and the G major scale; the C major scale, the D minor scale, and the E minor scale; the C major scale, the D minor scale, and the G major scale; the C major scale, the E minor scale, and the F major scale; and the C major scale, the F major scale, and the G major scale. Thus, diagram of keyboard (501) is essentially eight correlations in one.
Chunks of Information In some embodiments, including diagram of keyboard (501), five colors, or chunks, of information occur in the color code. This simplifies the process of learning, and recognizing, relationships between notes, scales, and chords. Traditional names of notes (C, C#, Db, D, D#, Eb, E, F, F#, Gb, G, G#, Ab, A, A#, Bb, and B) make the process of learning, and recognizing, relationships between musical concepts more complicated than necessary for any beginner. In FIG. 5, five different colors result, not seven different names of notes.

Without flat and sharp signs, without letters, and with less chunks of information to remember, I believe that teaching students of music with teaching aids of correlations, in color codes, number codes, or both, could enable students to comprehend music theory more quickly and more effectively.

Purposes of Embodiment

In FIG. 5, diagram of keyboard (501) shows that there are notes that occur more often than other notes of the correlation of scales. In FIG. 5, diagram of keyboard (501) shows one example of a multitude of possible correlations of scales. In FIG. 5, diagram of keyboard (501) shows that the C note, the D note, the E note, the G note and the A note are more common than other notes that occur in the correlation of scales. Also, diagram of keyboard (501) shows that the F note and the B note are more common than the F sharp note (or the G flat note) and the A sharp note (or the B flat note) in the correlation of scales.
Ramifications Instruments could be manufactured to exclusively play notes that occur in any particular correlation of scales or chords, such as the correlation in FIG. 5, as well. Instruments like these could be manufactured according to how often notes occur in any number of possible correlations.

OPERATION

Additional Embodiment

Someone inputs one scale into the computer program. The computer program assigns one color to notes of the scale. Someone inputs at least one more scale into the computer program. The computer program then assigns at least one more color to notes of at least one more scale. The computer program assigns colors to notes of as many scales as someone chooses to input into the computer program. The computer program then correlates the scales. Finally, the computer program assigns distinguishing colors to notes that are more common than other notes of the correlation of scales. The computer program assigns different colors to notes according to how often notes occur in the correlation of scales. Thus, the computer program makes certain notes distinguishable from other notes in the correlation. The computer program then conveys the resulting color code on its monitor ("M" within square). In FIG. 5, diagram of keyboard (501) shows the correlation.

DESCRIPTION

Additional Embodiment

In FIG. 6, the computer program correlates one chord with one scale. The computer program conveys the correlation on its monitor ("M" within square). The computer program conveys the correlation of the C major chord and the C major scale.

The computer program assigns one color to notes of the C major chord. The computer program assigns one different color to notes of the C major scale. The computer program assigns the primary color yellow to notes that occur in the C major chord. The computer program assigns the primary color red to notes that occur in the C major scale.

Color Code

In the correlation in FIG. 6, the computer program shades keys different colors according to the method. The C note, the E note, and the G note occur in the C major chord and the C major scale. The C note, the E note, and the G note also occur more often than other notes of the correlation. The computer program shades keys that represent the C note, the E note, and the G note the color orange.

In the correlation in FIG. 6, the computer program also shades keys primary colors. The computer program does not shade any keys the color yellow because there are no notes of the C major chord that do not occur in the C major scale. The computer program shades keys that represent the D note, the F note, the A, and the B note the color red. The computer program shades keys the color red because there are notes of the C major scale that do not occur in the C major chord.

Purposes of Embodiment

In FIG. 6, diagram of keyboard (601) shows that there are notes that are more common than other notes of the correlation of one chord and one scale. In FIG. 3, diagram of keyboard (301) shows that the C note, the E note, and the G note are more common than other notes that occur in the correlation of one chord and one scale.

Ramifications

By the method, the computer program can correlate any number of chords with any number of scales.

OPERATION

Additional Embodiment

Someone inputs one chord into the computer program. The computer program assigns one color to notes of the chord. Someone inputs one scale into the computer program. The computer program then assigns a different color to notes of the scale. The computer program then correlates the chord with the scale. The computer program assigns more colors to notes of other chords or scales as necessary. Finally, the computer program assigns at least one distinguishing color to notes that are more common than other notes of the correlation. The computer program assigns different colors to notes according to how often notes occur in chords and scales of the correlation. Thus, the computer program makes certain notes distinguishable from other notes in the correlation. The computer program then conveys the resulting color code on its monitor ("M" within square). In FIG. 6, diagram of keyboard (601) shows the correlation.

DESCRIPTION

Additional Embodiment

In FIG. 7, the computer program conveys another correlation of chords. The computer program assigns numbers to notes in the embodiment of the method.

In FIG. 7, the computer program correlates two chords with one another. The computer program conveys the correlation on its monitor ("M" within square). The computer program conveys the correlation of the C major chord and the D minor chord.

The computer program assigns numbers, as opposed to colors, to notes of chords in the embodiment. The computer program assigns a number "1" to notes that occur in the C major chord. The computer program also assigns the number "1" to notes that occur in the D minor chord.

Number Code

In FIG. 7, diagram of keyboard (701) shows that no notes occur more often than other notes of the correlation of chords.

In FIG. 7, the computer program assigns the number "1" to notes of chords. Then the computer program correlates the chords. When there are notes that occur more than once in the chords of the correlation, the computer program assigns a number such as "2" to more common notes of the correlation. When the computer program correlates three chords, the computer program assigns a number "3" to notes that occur three times in the chords of the correlation. And so on.

The computer program "labels" or "marks" keys according to how often notes occur in the chords of the correlation. The computer "labels" the number "1" to keys that represent the notes in the correlation because each note that occurs in the correlation occurs in one, but not more than one, of the chords in the correlation.

In the correlation, the computer program does not assign the number "2" to any notes because there are none that occur two times in the chords of the correlation. In other words, the computer program does not assign other numbers to notes because there are no notes that occur in both chords of the correlation. Thus, diagram of keyboard (701) shows that no notes are more common than other notes of the correlation of chords.

Contrast of Color Codes and Number Codes

By the method, notes are assigned numbers instead of, or in addition to, colors. In color codes, notes are assigned different colors according to how often notes occur, but also according to which chord, or chords, notes occur in. In number codes, notes that occur the same amount of times in correlations, but in different chords, are assigned the same number. With number codes, like the number code in FIG. 7, notes are simply assigned numbers according to how often they occur in correlations.

Musicians could use number codes of correlations to write melodies for their musical pieces. Musicians could also use pluralities of correlations for their musical pieces. Finally, musicians could write solos with number codes of correlations as well.

Purposes of Embodiment

In FIG. 7, the correlation of chords in diagram of keyboard (701) shows that no notes are more common than other notes of the correlation of chords. The computer program also enables those who suffer from colorblindness to use the method as well.

Ramifications of Number Codes

By the method, when numbers are used, any number of chords could be correlated with one another. By the method, when numbers are used, any number of scales could also be correlated with one another. Finally, by the method, when numbers are used, any number of chords could be correlated with any number of scales.

Any distinguishing features such as colors, numbers, letters, shapes, patterns, or even braille, or a combination of such features, could be assigned to notes in correlations of the method.

OPERATION

Additional Embodiment

Someone inputs one chord into the computer program. The computer program assigns one number, such as "1", to notes of the chord. Someone inputs a second chord into the computer program. The computer program then assigns the number to notes of the second chord. The computer program then correlates the chords. Finally, the computer program assigns distinguishing numbers to more common notes of the correlation, if necessary, to make more common notes distinguishable from less common notes. The computer program assigns different numbers to notes according to how often the notes occur in the chords of the correlation. Thus, the computer program makes certain notes distinguishable from other notes of the correlation. The computer program then conveys the resulting number code on its monitor ("M" within square). In FIG. 7, diagram of keyboard (701) shows the correlation.

DESCRIPTION

Additional Embodiment

In FIG. 8, the computer program correlates four chords with each other. The computer program conveys the correlation on its monitor ("M" within square). The computer program conveys the correlation of the C major chord, the D minor chord, the E minor chord, and the F major chord.
Number Code The computer program assigns the number "1" to notes of each chord. Then the computer program correlates the chords. The computer program then assigns numbers to notes according to how often notes occur in the chords of the correlation. When the chords are correlated the computer program assigns the number "2" to notes that occur two times in the chords of the correlation. The D note, the E note, the F note, the G note, and the B note occur two times in the chords of the correlation. The computer program "labels" keys accordingly in diagram of keyboard (801). The computer program shows that the D note, the E note, the F note, the G note, and the B note are more common than other notes that occur in the chords of the correlation.

Purposes of Embodiment

In FIG. 8, diagram of keyboard (801) show that there are notes that are more common than other notes of the correlation of chords. In FIG. 8, diagram of keyboard also shows that the D note, the E note, the F note, the G note, and the B note are more common than other notes that occur in the chords of the correlation. In FIG. 8, diagram of keyboard also shows that the C note and the A note are less common than other notes that occur in the chords of the correlation.
Ramifications While any colors could be assigned to notes in correlations of scales or chords, numbers could be assigned to notes instead of, or in addition to, colors.

Operation

ADDITIONAL EMBODIMENT

Someone inputs one scale or chord into the computer program. The computer program assigns one number, such as "1", to notes of the scale or chord. The computer program repeats this step as necessary for other scales or chords. Someone inputs at least one more scale or chord into the computer program. The computer program then assigns the number to notes of at least one more scale or chord. The computer program then correlates the chords. Finally, the computer program assigns distinguishing numbers to more common notes of the correlation, if necessary, to make more common notes distinguishable from less common notes. The computer program assigns different numbers to notes according to how often the notes occur in the scales or chords of the correlation. Thus, the computer program makes certain notes distinguishable from other notes in the correlation. The computer program then conveys the resulting number code on its monitor ("M" within square). In FIG. 8, diagram of keyboard (801) shows the correlation.

DESCRIPTION

Additional Embodiment

In FIG. 9, the computer program correlates three scales with each other. The computer program conveys the correlation on its monitor ("M" within square). The computer program conveys the correlation of the C major scale, the F major scale, and the G major scale.

The computer program assigns colors to notes of scales. The computer program assigns the primary color yellow to notes that occur in the C major scale. The computer program assigns the primary color red to notes that occur in the F major scale. The computer program assigns the primary color blue to notes that occur in the G major scale. The computer program then assigns distinguishing colors to notes according to how often notes occur in the correlation.

In FIG. 9, the number "1" is also assigned to notes in each scale in the correlation. Numbers are then assigned to notes according to how often notes occur in the scales of the correlation.
Color Code In the correlation, the computer program shades keys different colors according to the method. The computer program shades some keys the tertiary color brown in the embodiment. The computer program shades keys that represent the C note, the D note, the E note, the G note, and the A note the color brown. The computer program shades these keys the color brown because notes that the keys represent occur in all three of the chords in the correlation. The computer program also shades keys secondary colors. The computer program shades one key the secondary color orange. The F note occurs in the C major scale and the F major scale, but does not occur in the G major scale. Therefore, the computer program assigns the F key the color orange because the F note occurs in the C major scale and the F major scale, but not in the G major scale. The computer program shades one key the secondary color green. The computer program shades the B key the color green because the B note occurs in the G major scale, but does not occur in the C major scale or the F major scale.

In the correlation, the computer program shades keys that represent notes that occur in one scale, but not more than one scale, corresponding primary colors. The computer program shades the F sharp key (or the G flat key) the color blue because the F sharp note (or the G flat note) occurs in the G major scale, but does not occur in the C major scale or the F major scale. The computer program also shades the A sharp key (or the B flat key) the color red because the A sharp note (or the B flat note) occurs in the F major scale, but does not occur in the C major scale or the G major scale. Thus, diagram of keyboard (901) shows that the C note, the D note, the E note, the G note and the A note are more common than other notes that occur in the correlation of scales. Also, the correlation of scales in diagram of keyboard (901) shows that the F note and the B note are more common than the F sharp note (or the G flat note) and the A sharp note (or the B flat note).

Number Code

In the correlation, the computer program "labels" keys different numbers according to the method. The computer program "labels" some keys the number "3" in the embodiment. The computer program "labels" keys that represent the C note, the D note, the E note, the G note, and the A note the number "3". The computer program "labels" the keys the number "3" because the notes that the keys represent occur in all three of the chords of the correlation. The computer program also "labels" keys the number "2" in the embodiment. The computer program "labels" two keys the number "2" in the embodiment. The F key occurs in the C major scale and the F major scale, but does not occur in the G major scale. The B key occurs in the C major scale and the G major scale, but does not occur in the F major scale. The computer program "labels" the keys with the number two because both keys occur in two scales, but not all three scales, of the correlation.

In the correlation, the computer program "labels" keys that represent notes that occur in one scale, but not more than one scale, the number "1". The computer program "labels" the F sharp key (or the G flat key) the number "1" because the F sharp note (or the G flat note) occurs in the G major scale, but does not occur in the C major scale or the F major scale. The computer program also "labels" the A sharp key (or the B flat key) the number "1" because the A sharp note (or the B flat note) occurs in the F major scale, but does not occur in the C major scale or the G major scale. Thus, the correlation of scales in diagram of keyboard (901) shows, in the number code, that the C note, the D note, the E note, the G note and the A note are more common than other notes of the correlation. Also, the correlation of scales in diagram of keyboard (901) shows that the F note and the B note are more common than the F sharp note (or the G flat note) and the A sharp note (or the B flat note).

In FIG. 9, the computer program conveys both the color code and the number code for the correlation of scales.

Color Code and Number Code

By the method, color codes or number codes, or both, could be assigned to notes of scales or chords in correlations. The method could be used in either, or both, color codes or number codes.

Musicians could use either the color code, the number code, or both, when writing musical pieces.

Purposes of Embodiment

In FIG. 9, the correlation of scales in diagram of keyboard (901) shows that there are notes that occur more often than other notes of the correlation. In FIG. 9, diagram of keyboard (901) shows one example of a multitude of possible correlations of scales. In FIG. 9, diagram of keyboard (901) shows that the C note, the D note, the E note, the G note and the A note are more common than other notes of the correlation of scales. Also, the correlation of scales in diagram of keyboard (901) shows that the F note and the B note are more common than the F sharp note (or the G flat note) and the A sharp note (or the B flat note). In FIG. 9, diagram of keyboard shows how color codes and number codes could be used separately or simultaneously.

Ramifications

In diagram of keyboard (901), while one possible color code and one possible number code of the same correlation is included, differing correlations could be displayed, in color codes, number codes, or both, by the monitor ("M" within square).

OPERATION

Additional Embodiment

Someone inputs one scale or chord into the computer program. The computer program then assigns one color and one number to notes of the scale or chord. Someone inputs at least one more scale or chord into the computer program. The computer program then assigns at least one more color and the number to notes of at least one more scale or chord. The computer program assigns colors and numbers to notes of as many scales or chords as someone chooses to input into the computer program. The computer program then correlates the scales. Finally, the computer program assigns distinguishing colors and distinguishing numbers to notes that are more common than other notes of the correlation of scales or chords. The computer program assigns different colors and different numbers to notes according to how often the notes occur in the scales or chords of the correlation. Thus, the computer program makes certain notes distinguishable from other notes of the correlation. The computer program then conveys the resulting color code and number code on its monitor ("M" within square). In FIG. 9, diagram of keyboard (901) shows the correlation in the color code and number code.

DESCRIPTION

Additional Embodiment

In FIG. 10, two rows of labels are affixed to the keyboard ("K" within square) for the purpose of conveying two correlations.

The keyboard simultaneously conveys two different correlations. The keyboard conveys the correlation of the C major scale and the F major scale as the upper row of labels. The keyboard conveys the correlation of the C major scale and the G major scale as the lower row of labels.

Correlations of chords could be affixed to the keyboard as well. The keyboard, or any other instrument, could then be used as one of many possible teaching aids. Fretted instruments, such as guitars, could be affixed with labels for the same purpose. Labels of any possible correlation could be affixed to the keyboard, or any instrument, so that teachers would be able to teach musical concepts to their students with color codes.

While writing musical pieces, musicians would be able to associate more common notes, or less common notes, to corresponding labels.

Upper Row of Labels

In FIG. 10, the upper row of labels on the keyboard represent the correlation of the C major scale and the F major scale. While there are many labels in the upper row, upper label (1001) represents the C note.

The upper row of labels are affixed to keys of the keyboard. In the embodiment in FIG. 10, the color yellow is assigned to notes of the C major scale. The color red is assigned to notes of the F major scale.

Color Code of Upper Row

As for the upper row of labels, keys that occur in the C major scale, but not in the F major scale, are labeled with labels of one color, the color yellow, in the upper row. Keys that occur in the F major scale, but not in the C major scale, are labeled with labels of a different color, the color red, in the upper row. Keys that occur in the C major scale and the F major scale are labeled with yet another color of labels, the color orange, in the upper row. Thus, keys are labeled with labels of distinguishing colors according to how often notes occur in the correlation of the C major scale and the F major scale.

Labels in the upper row of the keyboard that are labeled primary colors are labeled accordingly for the correlation. Keys that represent more common notes are labeled the color orange in the upper row. Keys that represent the C note, the D note, the E note, the F note, the G note and the A note are labeled the color orange because the keys represent notes that are more common than other notes of the correlation of scales. Keys that represent less common notes, the A sharp note (or the B flat note) and the B note, are each labeled with different primary colors. The correlation of scales is affixed to the keyboard as the upper row of labels.

In FIG. 10, the upper row of labels shows that the A sharp note (or the B flat note) and the B note are less common than other notes that occur in the correlation of the C major scale and the F major scale.

Lower Row of Labels

Another row of labels on the keyboard represents the correlation of the C major scale and the G major scale. This enables the keyboard to convey another correlation. In FIG. 10, the lower row of labels on the keyboard represent the correlation of the C major scale and the G major scale. While there are many labels in the lower row, lower label (1002) represents the C note.

Color Code of Lower Row

In the embodiment, the color yellow is assigned to the C major scale. The color blue is assigned to the G major scale. The lower row of labels are affixed to keys of the keyboard. As for the lower row of labels, keys that occur in the C major scale, but not in the G major scale, are labeled with labels of one color, the color yellow, in the lower row. Keys that occur in the G major scale, but not in the C major scale, are labeled with labels of a different color, the color blue, in the lower row. Keys that occur in the C major scale and the G major scale are labeled with labels of yet another color, the color green, in the lower row. Thus, keys are labeled with labels of distinguishing colors according to the correlation of the C major scale and the G major scale.

Labels in the lower row of the keyboard that are labeled primary colors are labeled accordingly for the correlation. Keys that represent more common notes are labeled the color green in the lower row. The keys that represent notes that occur in the C major scale and the G major scale are labeled the color color green accordingly. Less common notes, the F note and the F sharp (or the G flat note), are each labeled with labels of different primary colors. The correlation of scales is affixed to the keyboard as the lower row of labels.

In FIG. 10, the lower row of labels shows that the F note and the F sharp note (or the G flat note) are less common than other notes that occur in the correlation of the C major scale and the G major scale.

Both Rows of Labels

Both rows of correlations can be compared with one another or used separately.

Purposes of Embodiment

In FIG. 10, the labels in both rows show that the F note, the F sharp note (or the G flat note), the A sharp note (or the B flat note), and the B note are less common than notes that occur in both correlation of scales. In FIG. 10, the lower row of labels shows that the F note and the F sharp note (or the G flat note) are less common than other notes that occur in the correlation of the C major scale and the G major scale. In FIG. 10, the upper row of labels shows that the A sharp note (or the B flat note) and the B note are less common than other notes that occur in the correlation of the C major scale and the F major scale.

Ramifications

Any number of color codes or number codes of any possible correlations of scales, chords, or scales and chords, could be affixed to any instrument for the purpose of teaching musical concepts or writing musical pieces. Rows of scales, chords, or any number of scales or chords, could also be affixed to instruments for beginners.

OPERATION

Additional Embodiment

Someone affixes labels to keys of the keyboard. Someone affixes the labels in at least two rows. Each row of labels represents a different correlation of scales or chords. Someone affixes one correlation of scales or chords as the upper row of labels. Someone affixes another correlation of scales or chords as the lower row of labels. The keyboard ("K" within square) then simultaneously conveys at least two correlations.

DESCRIPTION

Additional Embodiment

In FIG. 11, one row of labels of numbers are affixed to the keyboard ("K" within square) for the purpose of conveying one correlation.

The keyboard conveys one correlation, the correlation of the C major scale, the F major scale, and the G major scale, as one row of labels.

Labels of Number Code

While there are many labels in the row, label of number (1101) represents the F sharp note (or the G flat note).

In the embodiment in FIG. 11, the number "1" is assigned to notes of scales. The labels are affixed to keys of the keyboard.

Color Code of Row

As for the row of labels, keys that represent notes that occur in the C major scale, the F major scale, and the G major scale, are labeled the number "3". The F key is labeled the number "2" because the F note occurs in the C major scale and the F major scale, but does not occur in the G major scale. The B key is labeled the number "2" because the B note occurs in the C major scale and the G major scale, but does not occur in the F major scale. The key that represents the F sharp note (or the G flat note) is labeled the number "1" because the F sharp note (or the G flat note) occurs in the G major scale, but does not occur in the C major scale or the F major scale. The key that represents the A sharp note (or the B flat note) is labeled the number "1" because the A sharp note (or the B flat note) occurs in the F major scale, but does not occur in the C major scale or the G major scale. Thus, keys are labeled with labels of distinguishing numbers according to how often corresponding notes occur in the correlation of the C major scale, the F major scale, and the G major scale.

Purposes of Embodiment

In FIG. 11, the keyboard shows that the C note, the D note, the E note, the G note, and the A note are the most common notes of the correlation of scales. In FIG. 11, the keyboard also shows that the F note and the B note are less common than five other notes that occur in the correlation of scales. In FIG. 10, the keyboard also shows that the F sharp note (or the G flat note) and the A sharp note (or the B flat note) are the least common notes of the notes that occur in the correlation of scales. Unlabeled keys represent notes that simply do not occur in any of the scales of the correlation.

Ramifications

Any two scales or chords, or any combination of scales or chords, could be affixed to any instrument so that the method could be performed mentally. Any number of correlations could be affixed to any instrument as well. Correlations of chords could be affixed to the keyboard, in at least one row, as well. The keyboard, or any other instrument, could then be used as one of many possible teaching aids. Fretted instruments, such as guitars, could be affixed with labels for the same purposes. Labels of any possible correlation could be affixed to any instrument so that teachers would be able to teach musical concepts to their students with number codes.

OPERATION

Additional Embodiment

Someone affixes labels of numbers to the keyboard. Someone affixes the labels in at least one row. At least one row of labels represents at least one correlation of scales or chords. The keyboard ("K within square) then conveys at least one correlation of scales or chords for the purpose of comparing and contrasting differing scales or chords.

DESCRIPTION

Additional Embodiment

In FIG. 12, light bulbs of seven colors are wired to the keyboard ("K" within square). Two rows of seven light bulbs of different colors are wired to the keyboard for each key of the keyboard. Light bulbs, like light bulb (1201), are wired to the keyboard in FIG. 12.

Somewhat like labels in previous embodiments, light bulbs would enable the keyboard to convey at least one correlation of scales or chords. The keyboard would convey correlations before, during, or after musical pieces. The light bulbs would enable the keyboard to convey any possible plurality of correlations so that, in correlations, more common notes would be distinguishable from less common notes.

Two rows of light bulbs are wired to the keyboard. Each row is wired to the keyboard to display one color code. Both rows of light bulbs are wired to the keyboard for displaying distinguishing colors of two different correlations of scales or chords. In other words, one row is wired to enable the keyboard to convey one correlation, while another is wired to enable the keyboard to convey another correlation.

With light bulbs and computer programs wired to the keyboard to control light bulbs, the keyboard could be programmed to convey different correlations with light bulbs. The keyboard could also be programmed to convey two correlations and then convey any different combination of correlations for the purpose of writing different parts of musical pieces. Verses could be written with two correlations, while choruses could be written with any another combination of correlations.

Purposes of Embodiment

The keyboard could convey correlations of scales. The keyboard could convey correlations of chords. Finally, the keyboard could convey pluralities of scales and chords as well. Musicians could then associate colors to notes for the purpose of understanding and recognizing more common notes, less common notes, and notes that do not occur, in correlations.

Ramifications

Any two scales or chords, or any combination of the two, could be inputted into the keyboard by teachers or students.

The keyboard could simply convey two scales or chords, simultaneously, in color codes. The keyboard could also convey pluralities of correlations for educational purposes. Teachers could then use the keyboard to teach scales, chords, and correlations, to their students, in color codes, number codes, or both. Keyboards could convey number codes as well. Finally, the keyboard, the computer program, or any instrument, could convey any possible combination of correlations of scales and chords, in color codes, number codes, or both.

OPERATION

Additional Embodiment

Someone wires the keyboard with light bulbs of different colors. Someone then inputs any possible correlation of scales, any possible correlation of chords, or any possible correlation of scales and chords, into the keyboard. The keyboard then conveys at least one correlation. In FIG. 12, the keyboard ("K" within square) lights at least one of its light bulbs, like light bulb (1201), in at least one possible color code of at least one possible correlation.

DESCRIPTION

Additional Embodiment

In FIG. 13, the method is applied to musical notation. The method is applied to musical notation by adding numbers, colors, or numbers of colors, like number of color (1301) for the purpose of conveying at least one correlation of scales or chords.

In FIG. 13, number or colors, like number of color (1301), show how often notes occur in the correlation of the C major scale, the F major scale, and the G major scale.

Purposes of Embodiment

The numbers in FIG. 13, two and three, show how often notes occur in the correlation with two chunks of information, or two different numbers. The colors of the numbers show which notes occur in which scales of the correlation with three chunks of information, or three different colors. The numbers of colors in FIG. 13 show how often notes occur in the chords of the correlation. The numbers of colors also show which scales of the correlation each note occurs in. Therefore, the musical piece, with the numbers of colors, show all of the information in five chunks of information.

Ramifications

Numbers could be added to musical notation. Colors could be added to musical notation. Numbers of colors could be added to musical notation. More than one correlation could be added in numbers, colors, shapes, braille, or any possible distinguishing feature, for the purpose of simplifying the relationships between musical concepts in music.

OPERATION

Additional Embodiment

In FIG. 13, numbers of colors, like number of color (1301), are added to musical notation. Sheets, charts, or posters, of musical pieces are then used as teaching aids so that students can learn, recognize, and recall, musical concepts in a simpler way.

CONCLUSION, RAMIFICATIONS, AND SCOPE

In conclusion, the method of correlating scales and chords in color codes and number codes is illustrated and described in the patent application.

I believe the method that is included would not replace earlier methods, but could be used as yet another way for teachers to teach musical concepts to their students.

Many different embodiments are included in the application. While the computer program has the most versatility, the drawings include many other possible embodiments that would be more affordable for musicians.

There are also many advantages of the method and embodiments:

- without flat signs, sharp signs, and letters, notes, scales, and chords can be recognized, and recalled, with more accuracy and with less chunks of information;
- any plurality of scales or chords can be simultaneously conveyed, in color codes, in number codes, or both, for the purpose of comparing and contrasting scales, chords, or both;
- any chords can be correlated with one another in color codes;
- any scales can be correlated with one another in color codes;
- any chords can be correlated with any scales in color codes;
- any chords can be correlated with one another in number codes;
- any scales can be correlated with one another in number codes;
- any chords can be correlated with any scales in number codes;
- any chords can be correlated with any scales in color codes and number codes at the same time;
- any instrument can be labeled for educational purposes;
- any instrument can be labeled with pluralities of scales, or chords, or one scale and one chord, for educational purposes;
- computer programs, video games, and posters, can all be manufactured to convey any number of possible correlations for educational purposes.

More colors such as light brown, reddish-brown, and dark brown could be assigned to notes accordingly. Other possible distinguishing features like letters, braille, or even shapes could be assigned to notes in correlations of scales, chords, or scales and chords. Diagrams of any instruments could be printed on paper for educational purposes. While the keyboard is illustrated, labels could also be manufactured for any instrument. Color codes and number codes could be made for any key.

While my above description contains many specificities of many different embodiments, these should not be construed as limitations on the scope, but rather as an exemplification of many different embodiments thereof. Many other variants are possible. For example, shapes and braille, or any combination of possible distinguishing features, are other possible variants of one or more embodiments.

Accordingly, the scope should not be determined by the embodiments included, but by the appended claims and their legal equivalents.

I claim:

1. A method of correlating musical notes of a plurality of musical scales or musical chords utilizing a computer program, the method comprising:
  a. inputting a first one of the musical scales or musical chords into the computer program, and
  b. inputting a second one of the musical scales or musical chords into the computer program,
  the computer program being configured to: assign a first color to musical notes of the first one of the musical scales or musical chords, assign a second color different from the first color to the musical notes of the second one of the musical scales or musical chords, correlate the musical notes of the first one of the musical chords or musical scales with the musical notes of the second one of the musical chords or musical scales by assigning a distinguishing color different from the first color and the second color to musical notes that occur in both of the first one and the second one of the musical scales or the musical chords, and then displaying with a monitor the first one of the musical scales or the musical chords and the second one of the musical scales or the musical chords with the assigned first color, the assigned second color and the distinguishing color as a teaching aid.

2. A method according to claim 1, wherein:
  a. inputting a first one of the musical scales or musical chords into the computer program comprises inputting a first one of the musical chords into the computer program, and
  b. inputting a second one of the musical scales or musical chords into the computer program comprises inputting a second one of the musical chords into the computer program,
  the computer program being further configured to assign the first color to the musical notes in the first one of the musical chords, to assign the second color to the second one of the musical chords, and to assign the distinguishing color to musical notes that occur in both of the first one of the musical chords and the second one of the musical chords, and then conveys the first one of the musical chords and the second one of the musical chords with the assigned first color, the assigned second color and the distinguishing color as the teaching aid.

3. A method according to claim 1, wherein:
  a. inputting a first one of the musical scales or musical chords into the computer program comprises inputting a first one of the musical chords into the computer program, and
  b. inputting a second one of the musical scales or musical chords into the computer program comprises inputting a second one of the musical chords into the computer program,
  the computer program being further configured to assign a first number to the musical notes in the first one of the musical chords and to the musical notes in the second one of the musical chords, and to assign at least one distinguishing number to ones of the musical notes that occur in both of the first one of the musical chords and the second one of the musical chords, and then conveys the first number and the distinguishing number as a portion of the teaching aid.

4. A method according to claim 1, wherein:
a. inputting a first one of the musical scales or musical chords into the computer program comprises inputting a first one of the musical scales into the computer program, and
b. inputting a second one of the musical scales or musical chords into the computer program comprises inputting a second one of the musical scales into the computer program,
the computer program being further configured to assign the first color to the musical notes of the first one of the musical scales, to assign the second color to the second one of the musical scales, and then to assign the distinguishing color to the musical notes that occur in both of the first one of the musical scales and the second one of the musical scales, and then conveys the assigned first color, the assigned second color and the distinguishing color as a portion of the teaching aid.

5. A method according to claim 1, wherein:
a. inputting a first one of the musical scales or musical chords into the computer program comprises inputting a first one of the musical scales into the computer program, and
b. inputting a second one of the musical scales or musical chords into the computer program comprises inputting a second one of the musical scales into the computer program,
the computer program being further configured to assign a first number to the musical notes to the first one of the musical scales and to the second one of the musical scales, and then to assign at least one distinguishing number to the musical notes that occur in both of the first one of the musical scales and the second one of the musical scales, and then conveys the first number and the distinguishing number as a portion of the teaching aid.

6. A method according to claim 1, wherein:
a. inputting a first one of the musical scales or musical chords into the computer program comprises inputting at least one of the musical scales into the computer program, and
b. inputting a second one of the musical scales or musical chords into the computer program comprises inputting at least one of the musical chords into the computer program,
the computer program being further configured to assign the first color to musical notes in the at least one of the musical scales, to assign the second color to musical notes in the at least one of the musical chords, and then to assign the distinguishing color to ones of the musical notes that are common to the at least one of the musical scales and the at least one of the musical chords, and then conveys the first color, the second color and the distinguishing color as a portion of the teaching aid.

7. A method according to claim 1, wherein:
a. inputting a first one of the musical scales or musical chords into the computer program comprises inputting at least one of the musical scales into the computer program, and
b. inputting a second one of the musical scales or musical chords into the computer program comprises inputting at least one of the musical chords into the computer program,
the computer program being further configured to assign at least one number to the musical notes in the at least one of the musical scales, to assign the number to the musical notes in the at least one of the musical chords, and then to assign at least one said distinguishing number to ones of the musical notes that are common to the at least one of the musical scales and the at least one of the musical chords, and then conveys the number and the distinguishing number as a portion of the teaching aid.

8. A method according to claim 1, wherein:
a. inputting a first one of the musical scales or musical chords into the computer program comprises inputting at least a first one of the musical chords into the computer program, and
b. inputting a second one of the musical scales or musical chords into the computer program comprises inputting at least a second one of the musical chords into the computer program,
the computer program being further configured to assign the first color to musical notes in the first one of the musical chords, to assign the second color to musical notes in the second one of the musical chords, and to assign numbers to the musical notes in the first one of the musical chords and in the second one of the musical chords, and then to assign at least one distinguishing color and at least one distinguishing number to ones of the musical notes that are in both the first one of the musical chords and the second one of the musical chords, and then conveys the first color, the second color, the numbers, the at least one distinguishing color and the at least one distinguishing number as a portion of the teaching aid.

9. A method according to claim 1, wherein:
a. inputting a first one of the musical scales or musical chords into the computer program comprises inputting at least a first one the musical scales into the computer program, and
b. inputting a second one of the musical scales or musical chords into the computer program comprises inputting at least a second one of the musical scales into the computer program,
the computer program being further configured to assign the first color to musical notes in the first one of the musical scales, to assign the second color to musical notes in the second one of the musical scales, and to assign numbers to the musical notes in the first one of the musical scales and in the second one of the musical scales, and then to assign at least one distinguishing color and at least one distinguishing number to musical notes in both the first one of the musical scales and the second one of the musical scales, and then conveys the first color, the second color, the numbers, the at least one distinguishing color and the at least one distinguishing number as a portion of the teaching aid.

10. A method according to claim 1, wherein:
a. inputting a first one of the musical scales or musical chords into the computer program comprises inputting at least one the musical scales into the computer program, and
b. inputting a second one of the musical scales or musical chords into the computer program comprises inputting at least one of the musical chords into the computer program,
the computer program being further configured to assign the first color and at least one number to musical notes of the first one of the musical scales, to assign the second color and the at least one number to musical notes of the at least one of the musical chords, and then to assign at least one distinguishing color and at least one distinguishing number to ones of the musical notes that are in both of the at least one of the musical scales and the at least one of the musical chords, and conveys the first color, the second color, the at least one distinguishing color and the at least one distinguishing number as a portion of the teaching aid.

11. A method according to claim 1, wherein:
a. inputting a first one of the musical scales or musical chords into the computer program comprises inputting at least a first one of the musical chords into the computer program, and
b. inputting a second one of the musical scales or musical chords into the computer program comprises inputting at least a second one of the musical chords into the computer program, the computer program being configured to assign a first primary color as the first color to musical notes of the first one of the musical chords, to assign a second primary color as the second color to musical notes of the second one of the musical chords, and then to assign at least one distinguishing secondary color to the musical notes that occur in both the first one of the musical chords and the second one of the musical chords, and then conveys the first primary color, the second primary color and the at least one distinguishing secondary color as a portion of the teaching aid.

12. A method according to claim 1, wherein:
a. inputting a first one of the musical scales or musical chords into the computer program comprises inputting at least a first one the musical scales into the computer program, and
b. inputting a second one of the musical scales or musical chords into the computer program comprises inputting at least a second one of the musical scales into the computer program, the computer program being configured to assign a first primary color to musical notes of said the first one of the musical scales, to assign a second primary color to musical notes of the second one of the musical scales, and then to assign at least one distinguishing secondary color to said musical notes that occur in both of the first one of the musical scales and in the second one of the musical scales, and then conveys the first primary color, the second primary color and the at least one distinguishing secondary color as a portion of the teaching aid.

13. A method according to claim 1, further comprising:
c. inputting a third one of the musical scales or musical chords into the computer program, the computer program being configured to assign distinguishing primary colors to musical notes that occur in only one of the first one of the musical scales or chords, the second one of the musical scales or the musical chords and the third one of the musical scales or the musical chords, assign distinguishing secondary colors to musical notes that occur more than one of the first one of the musical scales or chords, the second one of the musical scales or the musical chords and the third one of the musical scales or the musical chords, and assign at least one tertiary color to musical notes that occur all of the first one of the musical scales or chords, the second one of the musical scales or the musical chords and the third one of the musical scales or the musical chords, and then conveys the first color, the second color, the distinguishing primary colors and the distinguishing secondary colors as a portion of the teaching aid.

14. A method according to claim 1, wherein:
c. inputting a third musical scale or chord into the computer program, the computer program being configured to assign different distinguishing numbers to said musical notes in the first one of the musical scales or musical chords, the second one of the musical scales or the musical chords and the third one of the musical scales or the musical chords, according to how many times the musical notes occur, and conveys it's the first color, the second color and the different distinguishing numbers as a portion of the teaching aid.

15. A method according to claim 1, wherein the first color, the second color and the distinguishing color are conveyed in a braille representation.

16. A method of enabling a musical instrument to convey correlated musical notes of a plurality of musical scales or musical chords the method comprising:
a. assigning a first color to musical notes that occur in a first one of the musical scales or musical chords,
b. assigning a second color to musical notes that occur in a second one of the musical scales or musical chords, and
c. assigning at least one distinguishing color or at least one distinguishing number to musical notes that occur in both the first one of the musical scales or the musical chords and in the second one of the musical scales or the musical chords, and
d. enabling the musical instrument to convey at the first color, the second color and the at least one distinguishing color or the at least one distinguishing number with musical notes of the first one of the musical scales or musical chords and the second one of the musical scales or the musical chords as a teaching aid.

17. A method according to claim 16, further comprising:
affixing labels to the musical instrument,
the labels being configured to include the first color, the second color, and the at least one distinguishing color with the first one of the musical scales or musical chords and the second one of the musical scales or musical chords as the teaching aid.

18. A method according to claim 16, further comprising:
affixing labels to the musical instrument,
the labels being configured to include the first color, the second color, the at least one distinguishing color and at least one number with the first one of the musical scales or musical chords and the second one of the musical scales or musical chords as the teaching aid.

19. A method of the type according to claim 16, further comprising:
a. wiring at least seven of light bulbs of different colors to said musical instrument, the light bulbs being configured to the first color, the second color and the at least one distinguishing color so that the musical instrument is the teaching aid.

20. A method of correlating musical notes of musical scales, or musical chords, and applying the method to musical notation, so that a musical piece is transformed into a teaching aid, comprising:
a. assigning a first color to musical notes of a first one musical scale, or a first musical chord, and
b. assigning a second color to musical notes of a second musical scale, or a second musical chord,
c. assigning at least one distinguishing color to musical notes that occur in both of the first and the second musical scales, or the first and the second musical chords, and
d. displaying the musical piece with the first color, the second color and the at least on distinguishing color as the teaching aid.

* * * * *